United States Patent

Gilli

[11] 3,818,697
[45] June 25, 1974

[54] POWER PLANT AND METHOD FOR GENERATING PEAK POWER THEREIN

[75] Inventor: Paul Viktor Gilli, Vienna, Austria

[73] Assignee: Waagner-Biro A.G., Vienna, Austria

[22] Filed: Nov. 5, 1971

[21] Appl. No.: 195,947

[30] Foreign Application Priority Data
Nov. 6, 1970 Austria .................... 9986/70

[52] U.S. Cl. .................... 60/94 A, 122/35
[51] Int. Cl. .................... F01k 3/12
[58] Field of Search ......... 60/105, 108, 1, 73, 94 A; 122/35

[56] References Cited
UNITED STATES PATENTS

| | | | |
|---|---|---|---|
| 2,089,915 | 8/1937 | Gilli | 122/35 |
| 2,194,504 | 3/1940 | Kielland | 122/35 |
| 2,320,586 | 6/1943 | Gilli | 122/35 X |

Primary Examiner—Martin P. Schwadron
Assistant Examiner—Allen M. Ostrager
Attorney, Agent, or Firm—Steinberg & Blake

[57] ABSTRACT

A power plant, such as a nuclear power plant, and a method for generating peak power therein. The power plant has a thermal accumulator installation composed of main and superheat accumulators so that after the latter are charged steam for peak-power purposes may be derived therefrom in order to operate a turbine through steam generators and superheaters connected to the accumulators through conduits which operate at different pressure-and-temperature levels. The contents of at least some of the accumulators are circulated by a circulating means a plurality of times through the latter accumulators with the circulated contents of any one accumulator being successively directed to flow paths of progressively lower pressure-and-temperature levels during successive circulations of its contents therethrough.

33 Claims, 10 Drawing Figures

INVENTOR
PAUL VIKTOR GILLI
BY
Steinberg and Blake
ATTORNEYS

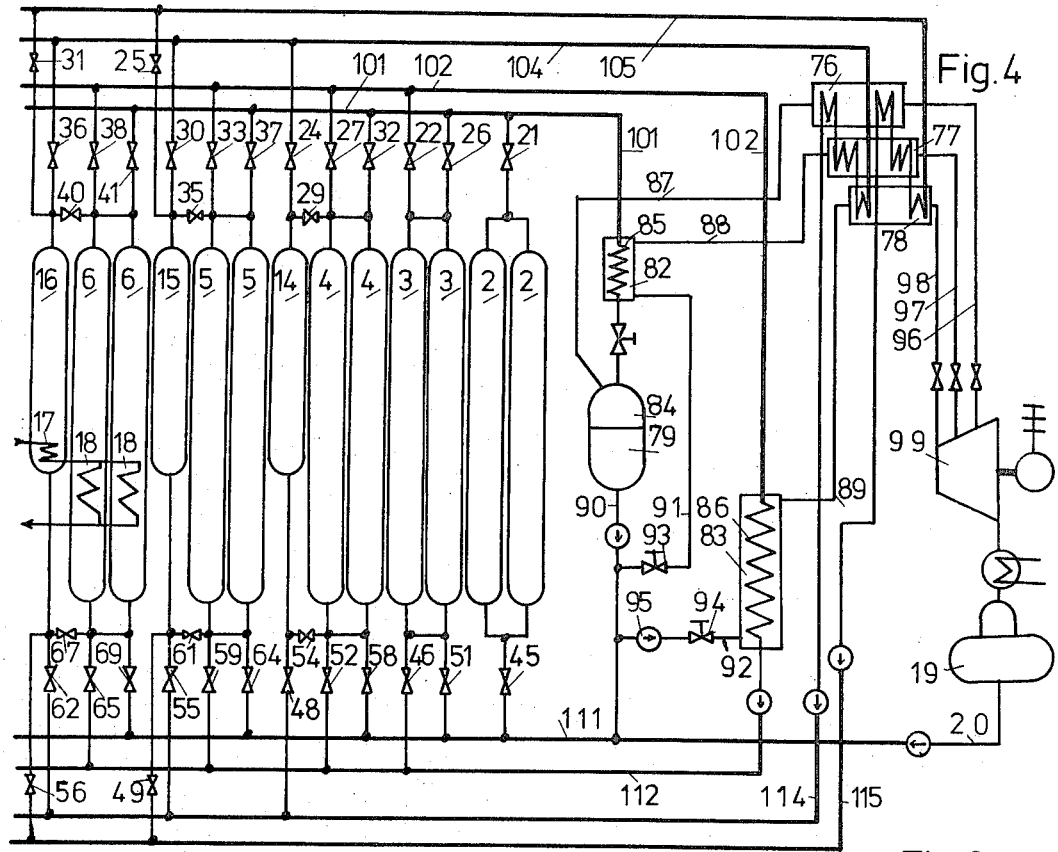
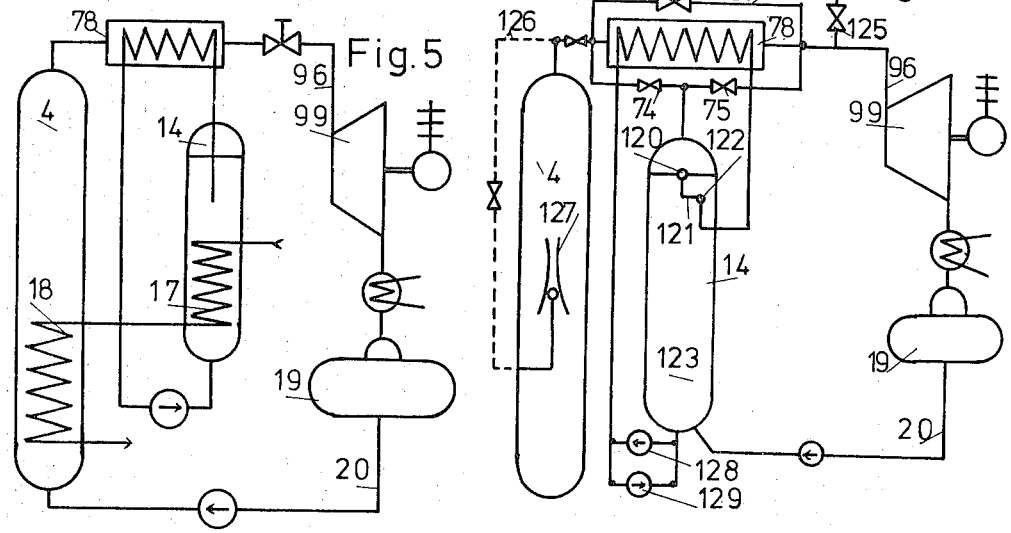
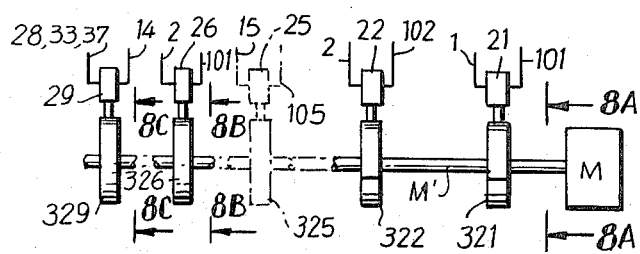

3,818,697

POWER PLANT AND METHOD FOR GENERATING PEAK POWER THEREIN

BACKGROUND OF THE INVENTION

The present invention relates to power plants, and in particular to nuclear power plants.

The present invention relates especially to a method and apparatus for achieving peak power from thermal accumulators which are charged by the base power system of the power plant during periods of low demand.

It is known to discharge hot water or steam accumulators as constant-pressure accumulators by circulating the contents of the accumulators only once therethrough. During this type of discharge, hot water is taken out of the upper part of the accumulator and at the same time completely discharged or, in other words, cooled water is fed into the lower part of the accumulator. As a result there is a formation of a boundary layer below which there is cold water in a discharged condition and above which there is hot water which is in a charged condition. The result is creation of extremely sharp temperature differentials and lack of constant thermal stresses in the walls of the accumulator. This latter type of operation results in fatigue of the structural components of the accumulator, particularly when utilizing high charging temperatures and high discharge frequencies. Furthermore, the mixing of the hot and cold water as well as the thermoconductivity of the accumulator wall structure work against a complete discharge of the accumulator contents.

SUMMARY OF THE INVENTION

It is accordingly a primary object of the present invention to provide a method and apparatus which will avoid the above drawbacks.

Thus, it is an object of the invention to provide a method and apparatus which will achieve a far more effective use of the thermal energy in an accumulator installation than has heretofore been possible.

A further object of the present invention is to provide a method and apparatus which make it possible to operate a thermal accumulator installation at extremely high temperatures and pressures.

It is an object of the present invention to provide a method and apparatus which will reliably maintain thermal stresses in the wall structure of the accumulators within acceptable ranges.

Yet another object of the present invention is to provide a method and apparatus which make it possible to achieve substantial economies in the operation of a power plant.

According to the invention the power plant includes a thermal accumulator installation composed of main and superheat accumulators. During a discharge operation the contents of at least some of the accumulators are circulated therethrough a plurality of times. The power plant includes steam generators and superheaters, and the contents of the accumulators are directed through a plurality of discharge conduit means to the steam generators and superheaters. The several discharge conduit means form flow paths which are respectively at different pressure-and-temperature levels, and during the successive circulations of the contents of a given accumulator through the latter these contents are successively directed along flow paths of progressively lower pressure-and-temperature levels.

BRIEF DESCRIPTION OF DRAWINGS

The invention is illustrated by way of example in the accompanying drawings which form part of this application and in which:

FIG. 4 is a schematic illustration of yet another embodiment of the invention;

FIG. 5 is a simplified schematic illustration of an installation which includes main and superheat accumulators where the main accumulator is a variable pressure accumulator;

FIG. 6 illustrates another embodiment of an installation of the type shown in FIG. 5;

FIG. 7 is a fragmentary schematic representation of controls and valves of the circulating means.

DESCRIPTION OF PREFERRED EMBODIMENTS

Figure 1:
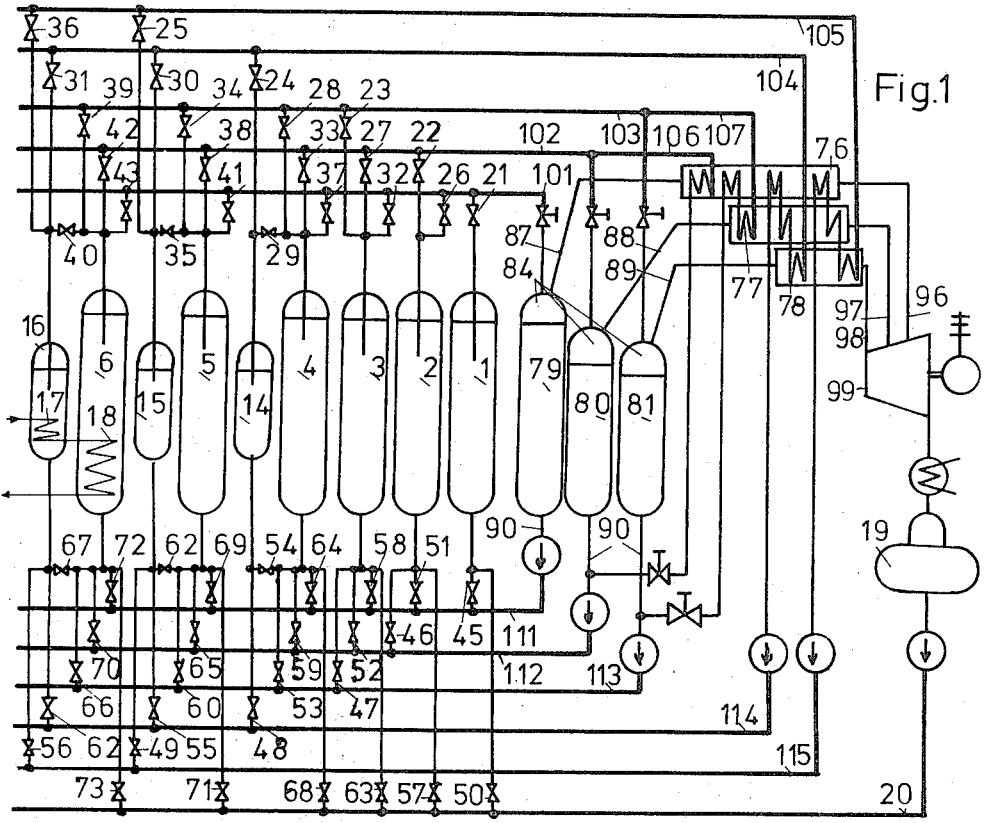
FIG. 1 is a schematic illustration of one embodiment of the invention.

Referring first to FIG. 1, there is diagrammatically illustrated therein an accumulator installation according to the invention. In the embodiment of FIG. 1 the installation includes the several main accumulators 1–6 and the superheat accumulators 14–16. It is to be understood that in actual practice any one of the illustrated accumulators may be replaced by a corresponding group of accumulators.

A circulating means is provided for circulating the contents of the accumulators therethrough in a predetermined manner described in greater detail below. This circulating means includes the valves 21–43 which communicate with the upper ends of the accumulators. These valves direct the contents of the accumulators through a plurality of discharge conduit means 101–105 which form flow paths for the contents of the accumulators. The discharge conduit means 101 has the lowest pressure-and-temperature level, while the discharge means 102 has the next higher pressure-and-temperature level, and so on with the discharge means 103, 104, and 105 respectively having still higher levels of pressure-and-temperature, each of which is greater than the next lower level and less than the next higher level so that the greatest pressure-and-temperature level is at the discharge conduit means 105 with the pressure-and-temperature level of the discharge conduit means 104 being between that of the conduit means 103 and the conduit means 105.

The discharge conduit means 101 communicates with a flash steam generator 79 in which the fluid is separated into its gaseous and liquid phases. The discharge conduit means 102 communicates with a flash steam generator 80 in which phase separation also takes place. This discharge conduit means 102 has a branch 106 part of which forms a heating coil in a superheater 76.

The discharge conduit means 103 communicates with a steam generator 81, which is of the same type as the generators 79 and 80, and this conduit means 103 has a branch 107 which forms part of the heating coils within a pair of superheaters, namely the superheater 76 which includes the coil portion of branch conduit 106 as well as a second superheater 77 which operates at a higher temperature than the superheater 76. In the portions of the conduits which communicate with the several steam generators there are adjustable throttling devices in the form of suitable valves, for example, as illustrated.

In addition to the superheaters 76 and 77 there is a third superheater 78 which operates at a temperature higher than the other superheaters. The discharge conduit means 104 has portions forming coils in all three superheaters, and the discharge conduit means 105 has portions forming heating coils in all three superheaters. It will be noted that the pair of discharge conduit means 104 and 105 first form heating coils within the superheater 78, then in the superheater 77 which operates at the next lower temperature, and finally in the superheater 76 which operates at the lowest temperature. In the case of the branch 107 of discharge conduit means 103, the superheater coil portions are situated first in the superheater 77 and then in the superheater 76.

The several steam generators 79-81 are respectively provided with steam chambers 84. These steam chambers respectively communicate through conduits 87-89 with the superheaters 76-78. Thus, the steam from the chambers 84 flows through the several superheaters, in countercurrent to the flow through the heating coils therein, and the superheated steam discharges out of the several superheaters through the supply steam lines 96-98 to the different stages of a turbine 99 which forms a power-consuming means. Thus, the turbine 99 has different pressure stages which respectively receive the superheated steam at different steam pressures.

Due to the phase separation which takes place in the several steam generators 79-81, there are situated therein below the steam chambers 84 bodies of liquid in the form of water which is relatively cool and free of pressure.

The separated water at the lower portions of the several steam generators 79-81 communicates through return lines 90 with continuations of the latter respectively formed by the return conduits 111-113. From the latter conduits the water is returned into the lower portions of corresponding accumulators which in the case of the several return conduit means 111-113 are only the main accumulators 1-6. The coil portions of the branches 106 and 107 communicate beyond the superheaters 76 and 77 with return conduit portions which respectively communicate with the return lines 90 leading from the generators 80 and 81, and these return portions from the superheater coils are also provided with adjustable throttle valves as illustrated. Thus, these superheater coil portions communicate with the return lines 112 and 113 either before or after the schematically illustrated circulating pumps which are connected thereto, and it will be noted that an additional circulating pump is provided for the return conduit 111.

The medium flowing through the pair of discharge conduit means 104 and 105, after being partly cooled in the superheaters 76-78 returns by way of the pair of return conduit means 114 and 115, which are connected with return pumps, to the superheat accumulators 14-16.

After the steam flows through the turbine 99 to drive the latter, the condensate thereof is collected first in the condensate container 19 and then, as required, from the tank 19 the liquid is delivered through the conduit 20 to the individual accumulators.

The circulating means includes not only the above conduits and valves but also the valves 45-73 which are controlled in any suitable way so as to regulate the return from the several return conduit means 111-115 and 20 to the several accumulators.

The several accumulators are charged by way of heat supplied through heating coils such as the coils 17 and 18 which are shown in the accumulators 16 and 6. It will be noted that the superheat accumulator 16 is associated with the main accumulator 6, and in this case the charging fluid first flows through the charging coil 17 for the superheat accumulator 16 and then through the charging coil 18 for the main accumulator 6. In the same way the superheat accumulator 15 is associated with the main accumulator 5 and the superheat accumulator 14 is associated with the main accumulator 4. All of the accumulators have such charging coils therein with the accumulators 15 and 5 as well as the accumulators 14 and 4 having charging coils arranged as shown for the accumulators 16 and 6. During periods of low demand when the entire power plant is not loaded to a great extent, steam, such as intermediate or fresh steam or any steam tapped from the main power plant, or feedwater therefrom, is directed through the charging coils for the accumulators shown in FIG. 1. This main power plant forms the base load energy circuit of the power plant and is not illustrated.

Table I on the following page illustrates the sequence of operation of the various parts of the system during one discharge operation where the Roman numerals in the first column show the successive stages of a discharge operation with all of the components which are operated during any given stage being indicated in Table I.

It will be seen from Table I that during the first stage of the illustrated discharge operation only the main accumulators 1-3 and the superheat accumulators 14 and 15 are operated with the contents thereof flowing through a single circulation during this first stage I.

During the next stage II, the main accumulators 2-4 and the superheat accumulators 14-16 are operated. Thus, the contents of the main accumulator 1 are circulated therethrough only once during the first stage of the discharge operation. The contents of the accumulators 2 and 3 as well as the superheat accumulators 14 and 15 are circulated therethrough a second time during the second stage II shown in Table I. It is to be noted that during this second stage of the discharge operation the valve 28 serves not only to connect the main accumulator 4 into the circuit but also to direct the contents of the superheat accumulator 14 through the discharge conduit means 3 together with the contents of the main accumulator 4. Thus, during the first stage the contents of the accumulator 14 were directed through the flow path provided by the discharge conduit means 104, while during the second stage the contents of the superheat accumulator 14 were directed through the discharge conduit means 103 which is the next lower presssure-and-temperature level. Also, while during the first stage the contents of accumulator TABLE I.—One Discharge Operation

| At stage | accumulator | is connected via valve | and valve | with steam line | and steam generator | and superheater | and via return line | and valve | and valve | back to accumulator |
|---|---|---|---|---|---|---|---|---|---|---|
| I | 1 | 21 | | 101 | 79 | | 111 | 45 | | 1 |
| | 2 | 22 | | 102 | 80 | 76 | 112 | 46 | | 2 |
| | 3 | 23 | | 103 | 81 | 77 | 113 | 47 | | 3 |
| | 14 | 24 | | 104 | | 78 | 114 | 48 | | 14 |
| | 15 | 25 | | 105 | | 78 | 115 | 49 | | 15 |
| | | | | Condensate* into condensate tank | | | | | | |
| II | 2 | 26 | | 101 | 79 | | 111 | 51 | | 2 |
| | 3 | 27 | | 102 | 80 | 76 | 112 | 52 | | 3 |
| | 4 | 28 | | 103 | 81 | 77 | 113 | 53 | | 4 |
| | 14 | 29 | 28 | 103 | 81 | 77 | 113 | 53 | 54 | 14 |
| | 15 | 30 | | 104 | | 78 | 114 | 55 | | 15 |
| | 16 | 31 | | 105 | | 78 | 115 | 56 | | 16 |
| | | | | Condensate* via | | | | 20 | 50 | 1 |
| III | 3 | 32 | | 101 | 79 | | 111 | 58 | | 3 |
| | 4 | 33 | | 102 | 80 | 76 | 112 | 59 | | 4 |
| | 14 | 29 | 33 | 102 | 80 | 76 | 112 | 59 | 54 | 14 |
| | 5 | 34 | | 103 | 81 | 77 | 113 | 60 | | 5 |
| | 15 | 35 | 34 | 103 | 81 | 77 | 113 | 60 | 61 | 15 |
| | 16 | 36 | | 104 | | 78 | 114 | 62 | | 16 |
| | | | | Condensate* via | | | | 20 | 57 | 2 |
| IV | 4 | 37 | | 101 | 79 | | 111 | 64 | | 4 |
| | 14 | 29 | 37 | 101 | 79 | | 111 | 64 | 54 | 14 |
| | 5 | 38 | | 102 | 80 | 76 | 112 | 65 | | 5 |
| | 15 | 35 | 38 | 102 | 80 | 76 | 112 | 65 | 61 | 15 |
| | 6 | 39 | | 103 | 81 | 77 | 113 | 66 | | 6 |
| | 16 | 40 | 39 | 103 | 81 | 77 | 113 | 66 | 67 | 16 |
| | | | | Condensate* via | | | | 20 | 63 | 3 |
| V | 5 | 41 | | 101 | 79 | | 111 | 69 | | 5 |
| | 15 | 35 | 41 | 101 | 79 | | 111 | 69 | 61 | 15 |
| | 6 | 42 | | 102 | 80 | 76 | 112 | 70 | | 6 |
| | 16 | 40 | 42 | 102 | 80 | 76 | 112 | 70 | 67 | 16 |
| | | | | Condensate* via and . . . , respectively | | | | 20 | 68 | 4 |
| | | | | | | | | 20 | 68 | 54 | 14 |
| VI | 6 | 43 | | 101 | | 79 | 111 | 72 | | 6 |
| | 16 | 40 | 43 | 101 | | 79 | 111 | 72 | 67 | 16 |
| | | | | Condensate* via and . . . , respectively | | | | 20 | 71 | 5 |
| | | | | | | | | 20 | 71 | 61 | 15 |
| VII | | | | Condensate* via and . . . , respectively | | | | 20 | 73 | 6 |
| | | | | | | | | 20 | 73 | 67 | 16 |

*Turbine Condensate Return.

2 were directed through the discharge conduit means 102, during the second stage the contents of the main accumulator 2 are directed through the discharge conduit means 101 which forms the next-lower pressure-and-temperature level.

The successive accumulators are operated in an analogous manner during the successive stages as illustrated in Table I until at stage VI it is only the last main and superheat accumulators 6 and 16 which are operated to bring about a final circulation of the contents thereof, with the contents of both of these accumulators at this time flowing through the discharge conduit means 101 which forms the lowest temperature-and-pressure level, and then at stage VII it is only the condensate from the turbine which is returned through the line 20, as indicated in the Table.

Moreover it is to be noted from the Table that the contents of the different accumulators circulate therethrough different numbers of times. As was pointed out above, the contents of accumulator 1 circulate therethrough only once. It will be noted from Table I that the contents of main accumulator 2 circulate therethrough twice, during the first and second stages, while the contents of main accumulator 3 circulate therethrough three times during stages I–III. The remaining main accumulators 4–6 also have the contents thereof circulated through three times as is apparent from Table I. While the contents of the superheat accumulator 14 are circulated therethrough four times in the illustrated example, the contents of the superheat accumulators 15 and 16 are circulated therethrough five times.

Moreover it will be noted that during stages II–VII, the condensate return conduit 20 is connected through the designated valves for returning condensate to the several main accumulators 1–6. Moreover, during stages V–VII, the condensate is also returned to the superheat accumulators 14–16.

Furthermore it will be noted that while all of the steam generators and superheaters are used during stages I–III of the discharge operation, the superheater 78 is no longer used starting with stage IV, the superheater 77 is no longer used after stage IV, and the steam generator 81 is no longer used after stage IV. Only superheater 76 is used during stage V, and at stage VI only the steam generator 79 which is connected to the conduit 101 of the lowest temperature-and-pressure level is operated.

It is clear that the number of stages of a discharge operation can be increased or decreased by decreasing the number of superheaters, steam generators, conduits, and valves, with or without an increase or decrease in the number of main and superheat accumulators.

Figure 2:
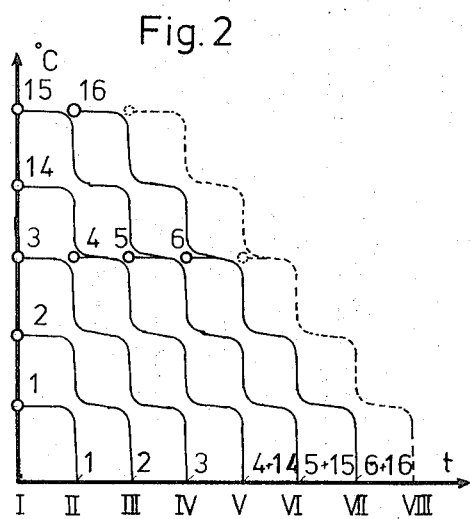
FIG. 2 is a graph illustrating the discharge operation with the embodiment of FIG. 1.

Referring to FIG. 2, there is illustrated therein a graph which shows how the discharge operation of the embodiment of FIG. 1 takes place. The ordinate of the graph shows the temperatures of the contents of the accumulators at the upper outlet ends thereof while the abscissa shows the successive stages during a discharge operation. FIG. 2 shows that the several accumulators are designed in groups so as to operate at different temperatures and pressures. Thus, the accumulator 1 is designed to operate at the lowest temperature and pressure, while the accumulator 2 is designed to operate at the next higher temperature and pressure. The accumulators 3–6 and any additional main accumulators will be designed all to operate at the same temperatures and pressures which are higher than those for which the accumulator 2 is designed. The superheat accumulator 14 is designed for operation at a still higher temperature and pressure, while the superheat accumulators 15 and 16 and any others that may be added will be designed to operate at the highest temperatures and pressures.

It is furthermore apparent from the graph of FIG. 2 that during stage I, it is the main accumulators 1–3 and the superheat accumulators 14 and 15 which are connected with the discharge conduits which form the flow paths to the steam generators and superheaters. Through this operation at stage I it is possible to achieve at the turbine 99 a full power output in the shortest time. This latter time is limited only by the time required for heating of the conduits and the turbine.

At the end of stage I the main accumulator 1 is taken out of the operation and the accumulators 2 and 3 are connected to the discharge conduit which has the next lower pressure-and-temperature level. The superheat accumulator 14 is now connected in parallel with the main accumulator 4, through the valve 29, as pointed out above. At this time, during stage II, the superheating is taken over by the superheat accumulators 15 and 16, and now the superheat accumulator 16 is connected into the circuit. These operations are repeated within the framework of the size of the installation as often as desired, which is to say as often as complete groups of accumulators consisting of accumulators 5 or 6 and the superheat accumulators 15 or 16 related thereto are available for operation. With the illustrated arrangement there is a temperature drop, as illustrated in FIG. 2, during the next following stages III–VI. The temperature drop of the total operation takes place in the illustrated example only after stage IV. The manner in which additional groups of accumulators would operate if incorporated into the system to increase the capacity thereof is illustrated in dotted lines.

Figure 3:
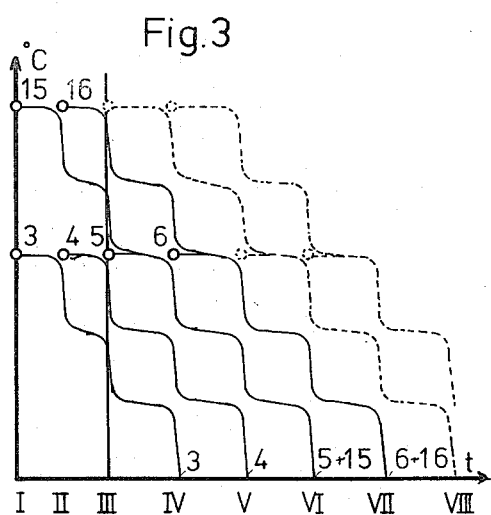
FIG. 3 is a graph illustrating a discharge operation for a different embodiment of the invention.

Referring to FIG. 3, a modification of the discharge operation illustrated in FIG. 2 is shown. In this case the main accumulators 1 and 2 and the superheat accumulator 14 are omitted so that the main accumulators, on the one hand, and the superheat accumulators on the other hand, all operate at uniform temperatures and pressures. Thus, at this time only the superheat accumulators 15 and 16, and any others which may be added to the system as desired, operate at the same pressure while the main accumulators 3–6, and any others which may be added as shown in dotted lines in FIG. 3 also operate at the same pressure. This system and manner of starting of the operation may be used with advantage if there is no requirement of a rapid start-up with full output of power. During the initial stage I of the discharge operation it is only the main accumulator 3 and the superheat accumulator 15 which operate, although it is possible to bring about an increase in the power output during this initial part of the discharge operation by forced discharge with simultaneous opening of valves 23, 27, 32, and 25–30 at the hot side and 47, 52, 58, as well as 49–55 at the cold side, so as to bring about in this way a shortening of the starting time during stage I and in an analogous manner also during stage II. In the same way as is illustrated in FIG. 2, with the operation shown in FIG. 3 at every successive stage of the discharge operation new groups of accumulators are brought into operation. Moreover it is apparent from FIG. 3 that after an initial discharge of the superheat accumulators they are connected with the main accumulators to operate therewith.

Referring now to FIG. 4, the schematically illustrated system according to the invention which is illustrated therein also includes main accumulators 2–6 and superheat accumulators 14–16 which are operated by way of a circulating means which includes the valves 20–43 and the discharge conduit means 101, 102, 104, and 105. It will be noted that this installation does not include an accumulator corresponding to the accumulator 1 or a discharge conduit corresponding to the conduit 103. Moreover in the embodiment of FIG. 4 each of the main accumulators 2–6 is made up of pair of accumulators of the same size, this embodiment where each main accumulator assembly includes only two identical accumulators being illustrated only by way of example since more accumulators may be included in each group if desired. Moreover, it will be seen that starting from the group of main accumulators 4, each group of successive main accumulators is associated with a smaller superheat accumulator, than was the case with the arrangement of FIG. 1. By way of the discharge conduit means 101 and 102, the hot water is directed to steam generators 82 and 83 which in this case are not flash steam generators in which phase separation takes place but instead are through-flow or circulating steam generators in which steam is generated by transfer of heat through the walls of the coils 85 and 86.

After the fluid in the discharge conduit means 101 has passed through the coil 85 of the steam generator 82, it passes through a pressure reduction valve or the like as well as a flash steam generator 79. With this arrangement it is possible to achieve from the circulated hot water steam of a lower pressure, and this steam is fed from the steam chamber 84 of the steam generator 79 through a conduit 87 to the superheater 76 which operates at the lowest pressure and temperature. The relatively cool water which accumulates at the lower part of the steam generator 79 flows through a conduit 90 to the return conduit means 111 back to the appropriate accumulator.

From the return conduit 90, downstream of the circulating pump connected thereto, part of the water is directed through a throttling and adjusting valve 93 and a conduit 91 into the space of the steam generator which surrounds the coil 85 therein. The steam which is generated in this way in the generator 82 is directed through the conduit 88 to the superheater 77 which operates at the next higher temperature. Thus, the conduit 91 serves as a feedwater conduit for the generator 82, and it is steam which flows through the intermediate superheater 77 to flow through the supply conduit 97 to the intermediate pressure stage of the turbine 99.

There is also connected to the return conduit 90 a conduit 92 which in accordance with the relative pressure level may be provided either with a circulating pump 95 and the adjustable valve control 94 or only with the throttling or adjusting control 94, and through this conduit 92 the water taken from the generator 79 is directed to the generator 83 into the space surrounding the coil 86 therein. In this way the saturated steam for the highest pressure stage of the turbine is achieved by way of superheating in the superheater 78 which operates at the highest temperature, with this steam being delivered to the turbine 99 through the supply conduit 98. The supply steam of lowest temperature and pressure is supplied through the conduit 96 from the superheater 76.

The pair of discharge conduit means 104 and 105 have coil portions situated successively, in the downstream direction, in the superheater 78, 77 and 76, as illustrated in FIG. 4, and it is the fluid flowing through these coils which serves to superheat the steam from the generators 79, 82, and 83, so as to achieve in this way the supply steam for the turbine 99. It is to be noted that while the steam is superheated in the several superheaters while flowing from left-to-right, as viewed in FIG. 4, the heating fluid which flows through the coils in the several superheaters flows therethrough from right-to-left, as viewed in FIG. 4, so that in this way a countercurrent type of operation is achieved.

The return of the contents of the several accumulators thereto takes place in a manner analogous to that described above in connection with FIG. 1 through the return conduit means 111, 112, 114, and 115, and for this purpose suitable circulating pumps and valves 45–69 form part of the circulating means.

The manner in which the embodiment of FIG. 4 operates during one discharge operation is shown on the next page in Table II.

FIG. 5 shows an accumulator installation provided with a main accumulator 4 which operates with a falling pressure and temperature. The steam from the main accumulator 4 is superheated in a superheater 78 through which the contents of a superheat accumulator 14 are circulated preferably from two to eight times, so that in this way the steam from the main accumulator 4 is superheated in the superheater 78 in order to then flow through the supply line 96 to the turbine 99. Of course, it is to be understood that in this case also several accumulators may be provided operating in suitable sequence in a manner as described above and shown in FIGS. 1–4, the output of the system being delivered to the turbine in such a way that the latter is provided with a uniform input of steam for operation.

The charging of the accumulators 4 and 14 takes place through the coils 17 and 18 as described above in connection with FIG. 1. The condensate from the tank 19 is returned to the main accumulator 4 through the return conduit 20.

It is to be noted that with this system the circulating path of flow for the superheat accumulator 14 is closed, so that by way of a circulating pump the contents of the superheat accumulator 14 are continuously circulated TABLE II.—One Discharge Operation

| At stage | accumulator | is connected via valve | and valve | with steam line | and steam generator | and superheater | and via return line | and valve | and valve | back to accumulator |
|---|---|---|---|---|---|---|---|---|---|---|
| I | 2 | 21 | | 101 | 82 | | 111 | 45 | | 2 |
| | 3 | 22 | | 102 | 83 | | 112 | 46 | | 3 |
| | 14 | 24 | | 104 | | 78 | 114 | 48 | | 14 |
| | 15 | 25 | | 105 | | 78 | 115 | 49 | | 15 |
| II | 3 | 26 | | 101 | 82 | | 111 | 51 | | 3 |
| | 4 | 27 | | 102 | 83 | | 112 | 52 | | 4 |
| | 14 | 29 | 27 | 102 | 83 | | 112 | 52 | 54 | 14 |
| | 15 | 30 | | 104 | | 78 | 114 | 55 | | 15 |
| | 16 | 31 | | 105 | | 78 | 115 | 56 | | 16 |
| III | 4 | 32 | | 101 | 82 | | 111 | 58 | | 4 |
| | 14 | 29 | 32 | 101 | 82 | | 111 | 58 | 54 | 14 |
| | 5 | 33 | | 102 | 83 | | 112 | 59 | | 5 |
| | 15 | 35 | 33 | 102 | 83 | | 112 | 59 | 61 | 15 |
| | 16 | 36 | | 104 | | 78 | 114 | 62 | | 16 |
| IV | 5 | 37 | | 101 | 82 | | 111 | 64 | | 5 |
| | 15 | 35 | 37 | 101 | 82 | | 111 | 64 | 61 | 15 |
| | 6 | 38 | | 102 | 83 | | 112 | 65 | | 6 |
| | 16 | 40 | 38 | 102 | 83 | | 112 | 65 | 67 | 16 |
| V | 6 | 41 | | 101 | 82 | | 111 | 69 | | 6 |
| | 16 | 40 | 41 | 101 | 82 | | 111 | 69 | 67 | 16 |

It will be noted that in order to simplify Table II, only the superheater 78 is specifically referred to and the generator 79 is not referred to. The reason for this is that the conduits 104 and 105 communicate first with the superheater 78. It is to be understood that subsequent to providing heat for the superheater 78, there will also be heat provided at successively lower temperatures for the superheaters 77 and 76, as pointed out above, although these superheaters are not referred to in Table II. In the same way, after heat is supplied to the generator 82 by way of the coil 85 which communicates with the conduit 101, there is necessarily a flash generation of steam in the generator 79, so that since the latter generator operates automatically subsequent to the generator 82, the generator 79 is not referred to in Table II. Thus, it will be understood that all of the superheaters and steam generators operate with the embodiment of FIG. 4, even though superheaters 76 and 77 and steam generator 79 are not specifically referred to.

through the superheater 14 in a an upward direction and then from right-to-left through the coils in the superheater 78, while the steam from the main accumulator 4 flows in the opposite direction through the superheater. As a result of this system it is possible to enclose in the superheater 14, in order to flow through the closed circuit, a liquid which has a high boiling point, such as, for example diphenyl, terphenyl, or oil, so that it is possible to design the superheat accumulator for operation at a relatively low pressure.

In the arrangement shown in FIG. 6, a further type of installation similar to that of FIG. 5 is illustrated. In this case the superheater 78 is provided with its source of heat from the superheat accumulator 14 from which the superheating liquid is taken by way of a float 120 which floats on the surface of the liquid and which communicates with a pipe 121 having a pivotal connection 122 with the conduit which leads to the right end of the heating coil within the superheater 78. Thus, the pivotal conduit connection 122 and the conduit 121 are located within the body of liquid 123 within the superheat accumulator 14.

In order to achieve a complete discharge of the superheat accumulator, there are provided in this case conduits communicating with the top end of the accumulator and having the valves 74 and 75 which may be check valves. By way of these valves it is possible toward the end of a discharge operation to take steam from the upper steam chamber of the superheat accumulator 14, and deliver this steam to the supply conduit 96 for the turbine 99. Thus, during the last part of a given discharge operation it is the superheat accumulator itself which acts as a falling pressure type of accumulator, in the same way as the main accumulator 4.

Connected in parallel with the superheater 78 is a bypass conduit 124, so that the pressure drop in the superheater 78 may be diminished during the continuing discharge of the main accumulator 4.

A valve 125 communicates with the base power system and serves to supply steam for charging purposes in the superheater 78. After this charging steam has cooled and condensed at least in part, it is conveyed by way of the conduit 126, illustrated in dotted lines, in the form of hot or saturated steam to the charging nozzle 127 in the interior of the main accumulator 4, so as to charge the latter. Thus, in this case there is a direct charging of the contents of the accumulator 4, as contrasted with the indirect charging which takes place by transfer of heat through the walls of the coils 17 and 18.

The charging and discharging of the superheat accumulator 14 of FIG. 6 takes place in a closed circuit through the superheater 78 and the circulating pumps 128 and 129. Thus, in the embodiment of FIG. 6, as in the embodiment of FIG. 5, it is possible to provide the superheat accumulator 14 with contents in the form of a liquid of high boiling point, such as, for example, diphenyl, terphenyl, oil, or paraffin. In this case, the additional conduits with the valves 74 and 75 are not necessary and are omitted.

The pumps 128 and 129 direct the contents of the superheater 14 in different directions so that counterflow operation can always be maintained in the superheater 78. Thus, during a discharge operation it is the pump 129 which is operated so as to cause the heating fluid to flow from the right end of the superheater 78 toward the left end thereof, as viewed in FIG. 6, while the steam from the accumulator 4 flows through the superheater 78 in the opposite direction to then flow through the line 96 to the turbine 99. On the other hand, during charging of the superheat accumulator 14, the pump 128 is operated to provide an opposite direction of circulation of the contents of the superheat accumulator 14, and at this time the coils within the superheater 78 will have the fluid within these coils flowing from the left toward the right, as viewed in FIG. 6, while the charging steam admitted through the valve 125 flows from the right toward the left, as viewed in FIG. 6. Of course, instead of using circulating pumps it is also possible to achieve the same results with suitable valves and conduits.

FIG. 7 is a fragmentary schematic illustration of that part of the circulating means which controls the valves. The structure is illustrated in FIG. 7 in connection with those valves situated at the upper, discharge ends of the accumulators, and it is to be understood that an identical structure is situated at the lower, return ends of the accumulators for actuating the several valves.

Figure 8A:
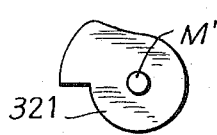
FIGS. 8A, 8B, and 8C are respectively views taken along lines 8A—8A, 8B—8B, and 8C—8C of FIG. 7 in the directions of the arrows illustrating the configurations of the cams and the angular orientation thereof with respect to each other.

In the particular example illustrated a motor M rotates at a predetermined speed which is carefully controlled, and it drives a cam shaft M' which carries a series of control cams used for opening and closing the various valves. The valves are assumed to be normally closed with the opening thereof being brought about by the control cams. By way of illustration valves 21 and 22 are shown, and it is to be understood that the additional valves 23 and 24 up to the valve 25 shown in phantom lines are situated in the manner illustrated in FIG. 7, so that the several valves can be opened by the rotary cams 321, 322, and additional cams up to the cam 325. These cams are all of an identical configuration and are angularly aligned with each other so that they all rotate in unison to bring about simultaneous opening and closing of the valves 21–25, so as to produce the operation for stage I of the discharge operation illustrated in Table I. The configuration of the cam 321 is illustrated in FIG. 8A, and it is to be understood that the remaining cams which coact with the valves 22–25 are of the same configuration and are angularly aligned with the cam 321 and fixed to the shaft M'.

The valve 21 is shown in FIG. 7 connected between the accumulator 1 and the discharge conduit 101, the valve 22 is shown between the accumulator 2 and the discharge conduit 102, and it is to be understood that the remaining valves 22–25 are connected in a similar manner.

Figure 8B:
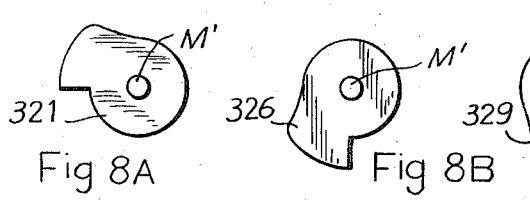

By way of illustration, a part of the cam shaft M' is shown in FIG. 7 fixedly carrying a cam 326 which controls the valve 26, and it will be understood that the remaining valves 27–31 are operated in the same way during stage II of the discharge operation. Thus, it will be seen that the valve 26 is shown in FIG. 7 connected between the accumulator 2 and the discharge conduit 101. The cam 326 has the configuration shown in FIG. 8B. It will be noted its angular orientation with respect to the cam 321 is such that the valve 26 will be opened subsequent to the closing of the valves 21–25, so that simultaneously with the closing of the latter valves the valve 26 is opened, and of course the other valves 27–31 are simultaneously opened by additional cams identical with the cam 326 and angularly aligned therewith.

In this way all of the valves may be opened and closed in the desired sequence so as to bring about operation of the system in the manner described above.

Figure 8C:

Some of the valves, such as the valve 29, are maintained open through several successive stages. Thus, it will be noted that the valve 29 is maintained in its open position through stages II–IV, in the example illustrated in Table I. Thus, for this purpose the valve 29 is actuated by a 329 the configuration of which is illustrated in FIG. 8C. It will be noted from FIG. 8C that the angular orientation of the cam 329 with respect to the cam 326 and the configuration of the cam 329 is such that the valve 29 will be opened simultaneously with the valve 28 but when the latter closes at the end of the second stage, the valve 29 will remain open during the next following stages III and IV, and of course during the stages III and IV the valve 29 will serve to place the superheat accumulator 14 in communication with the valves 33 and 37 to direct the contents of the superheat accumulator 14 through the discharge conduit 102 during stage III and through the discharge conduit 101, during stage IV, so that during these stages the superheat accumulator 14 is connected in parallel with the main accumulator 4.

Cams similar to the cam 329 are used to control the valves 35 and 40 with the angular orientation of these cams being such that the valve 35 is maintained open during the stages III–V, while the valve 40 is maintained open during the stages IV–VI.

As indicated above a similar cam shaft arrangement may be used for controlling the valves at the inlet ends of the accumulators. Also it is emphasized that these types of controls are illustrated only by way of example and that any suitable controls may be provided for opening and closing the various valves.

With the arrangements as illustrated in FIGS. 1–6 and described above, the discharge of the superheat accumulators and thus the temperature of the supply steam are regulated as required. In addition to achieving a control of the power output, obtained primarily by the discharge from the main accumulators, there is an additional control variable. Thus, for example, it is possible to control the discharge of the superheat accumulators, which is to say control the volume pumped by their circulating pumps, in accordance with the moisture content of the steam discharging from the turbine, with an acceptable degree of moisture in this steam being used as a reference or control value. In many cases, however, it may also be of advantage to provide controls by maintaining a constantly flowing volume of operating steam at the end or at the intermediate stage of the turbine, so that a good inner operating efficiency of the turbine is achieved. Moreover, it is of course possible to control the entire discharge operation, or only a part thereof, by providing a regulation which maintains a constant hot-steam temperature for the supply steam delivered to the turbine, and this particular type of control is of special advantage for the case where the discharge takes place at a constant pressure with arrangements as shown in FIGS. 1–4. Finally, in order to bring about a rapid starting and heating of the conduits and turbine, it is of advantage to adjust the circulated contents of the superheat accumulators to their maximum value during the beginning of the discharge operation.

The charging of the accumulators can take place through heat-transfer surfaces, such as by way of the coils 17 and 18 and shown in FIGS. 1, 4, 5 or there may be a direct charging by blowing steam directly into the contents of the accumulator, with use of a suitable nozzle, as illustrated in FIG. 6.

Moreover, according to one of the proposals of the present invention, it is possible to carry out the charging, with an arrangement as shown in FIG. 4, for example, by utilizing for charging purposes the heating coils of the superheaters 76–78. Such an arrangement has the advantage of eliminating the requirement of additional charging coils in the interior of the accumulators. With such an arrangement the charging steam may be taken during a time when there is a low demand from the base power plant through a valve similar to the valve 125 shown in FIG. 6. The charging steam from the basic power plant is then circulated through a system such as that shown in FIG. 4, while the contents of the several accumulators are charged, utilizing at this time the circulating pumps of FIG. 4 for the purpose of charging the contents of the several accumulators. In the event that steam is used for charging purposes with such an arrangement, the condensate can, as required, be delivered to the accumulators or back to the basic power plant, so that both water circuits can be maintained separate and balanced with respect to each other.

What is claimed is:

1. In a method for generating peak power during a discharge operation of a thermal accumulator installation of a power plant, such as nuclear power plant, which has main and superheat accumulators, the step of circulating the contents of at least some of the accumulators a plurality of times therethrough during a discharge operation.

2. In a method as recited in claim 1 and wherein the thermal accumulator installation includes a plurality of flow paths which are respectively at different pressure and temperature levels, including directing the contents of each accumulator whose contents are circulated therethrough a plurality of times successively through flow paths of progressively lower temperature and pressure levels during successive circulations of the contents of each of the latter accumulators therethrough.

3. In a method as recited in claim 1 and including the steps of superheating supply steam with the contents of a superheat accumulator during one circulation therethrough and generating supply steam with the contents of the latter superheater accumulator during the next circulation therethrough.

4. In a method as recited in claim 1 and including the steps of flashing and separating the phases of the circulated hot water of an accumulator in order to generate steam.

5. In a method as recited in claim 1 and wherein the circulated contents of an accumulator are placed in heat-exchange relationship with respect to a steam-generating medium while flowing in countercurrent thereto.

6. In a method as recited in claim 3 and including the steps of generating steam at different pressure levels with flashing and separation of the phases of the circulated contents of an accumulator at the lowest pressure level and with heat-exchange of the latter contents at a higher pressure level.

7. In a method as recited in claim 6 and including the step of forming from the circulated accumulator contents at the lowest pressure level, after heat is extracted therefrom, feedwater for a higher pressure level.

8. In a method as recited in claim 2 and wherein the power plant includes steam generators and a turbine having a plurality of stages, the steps of simultaneously discharging groups of accumulators into the steam generators and turbine stages.

9. In a method as recited in claim 8 and wherein the power plant includes flow paths at different pressure and temperature levels as well as accumulators of relatively low pressure and temperature levels and accumulators of relatively high pressure and temperature levels, the steps of simultaneously connecting both the relatively low and the relatively high pressure and temperature level accumulators to corresponding flow paths in order to achieve a rapid output of power.

10. In a method as recited in claim 1 and wherein during a discharge operation the contents of any given accumulator are circulated therethrough from 2 to 8 times.

11. In a method as recited in claim 1, the steps of extracting steam of continuously dropping pressure from a main accumulator while circulating hot water of a superheat accumulator during a first part of the discharge operation and during the last part thereof extracting from the superheat accumulator steam while feeding the latter steam into a steam supply line which communicates with the main accumulator.

12. In a method as recited in claim 1 and wherein the power plant includes main accumulators which respectively operate at higher and lower pressures and superheaters for respectively superheating the steam from the latter main accumulators, the step of supplying heat first to the superheater for the higher pressure steam and then to the superheater for the lower pressure steam with the circulated contents of a superheat accumulator.

13. In a method as recited in claim 1 and wherein individual main and superheat accumulators have different charging pressures, the step of indirectly charging the latter accumulators while directing a charging medium therethrough in a sequence from higher to lower charging pressures.

14. In a method as recited in claim 1 and wherein the power plant includes superheaters and steam generators, including the step of charging the accumulator contents with the superheaters or steam generators.

15. In a method as recited in claim 14 and including the steps of directing fluid through the superheaters and steam generators in one direction during charging of the accumulators and in an opposite direction during discharging thereof.

16. In a method as recited in claim 1 and wherein the power plant includes a turbine, the step of controlling the discharge operation of a superheat accumulator according to the moisture content of the steam at the outlet of the turbine while using the permissible moisture content of the steam as a constant reference value.

17. In a method as recited in claim 1 and wherein the power plant includes a turbine, the step of controlling the discharge of a superheater according to a constant volume of operating steam flowing through part of the turbine.

18. In a method as recited in claim 1 and wherein the power plant has a constant temperature for supply steam, the step of controlling the discharge of a superheat accumulator during at least part of a discharge operation according to the constant temperature of the supply steam.

19. In a method as recited in claim 1 and including the step of setting the circulated contents of a superheat accumulator at its maximum value during the beginning of the discharge of a main accumulator to achieve a rapid rise to the operating temperature.

20. In a power plant, such as a nuclear power plant, which has a power-consuming means and supply conduit means for supplying steam thereto, a thermal accumulator installation comprising a plurality of main accumulators and a plurality of superheat accumulators, a plurality of discharge conduit means communicating with said accumulators for discharging said accumulators, and circulating means operatively connected with said accumulators and with said plurality of discharge conduit means for circulating the contents of at least some of the accumulators a plurality of times through the latter accumulators and said plurality of discharge conduit means.

21. The combination of claim 20 and wherein said plurality of discharge conduit means respectively have different temperature levels, while said plurality of accumulators respectively have different charging pressures, said circulating means including valve means for respectively connecting different accumulators with different discharge conduit means.

22. The combination of claim 21 and wherein said circulating means circulates the contents of the accumulator of lowest pressure only once therethrough.

23. The combination of claim 21 and wherein some of said valve means are operatively connected with said superheat accumulators and with discharge conduit means which communicate with some of said main accumulators for connecting said superheat accumulators to the latter discharge conduit means, respectively.

24. The combination of claim 23 and wherein the power plant includes superheaters, said circulating means including not only valve means for connecting the superheat accumulators with the discharge conduit means which communicate with some of said main accumulators, but also valve means for connecting said superheat accumulators with said superheaters, respectively.

25. The combination of claim 21 and wherein said power-consuming means is a turbine having different pressure stages, a plurality of steam generators communicating with said discharge conduit means which communicate with said main accumulators for receiving steam therefrom, and a plurality of superheaters communicating with said steam generators and with said different pressure stages of said turbine for receiving supply steam from said steam generators and delivering the supply steam to the different pressure stages of the turbine.

26. The combination of claim 25 and wherein said steam generators are flash steam generators having steam chambers communicating with said superheaters, said steam generators having water chambers, and return conduit means communicating with said water chambers of said steam generators and with said accumulators for returning to the latter water from said steam generators.

27. The combination of claim 25 and wherein at least some of said steam generators are through-flow generators through which generated steam is circulated.

28. The combination of claim 25 and wherein said steam generators include through-flow and flash steam generators connected in series, said flash steam generator having a water chamber, and a conduit communicating with said water chamber and with said through-flow steam generator for supplying to the latter feed water from the water chamber of said flash steam generator.

29. The combination of claim 28 and wherein said conduit communicating with the water chamber of said flash steam generator has a means for controlling the pressure of the fluid therein.

30. The combination of claim 20 and wherein a superheater communicates through one of said discharge conduit means with one of said main accumulators for receiving supply steam therefrom, and said circulating means continuously circulating the contents of one of said superheat accumulators through said superheater for superheating the supply steam.

31. The combination of claim 20 and wherein a plurality of superheaters respectively communicate with accumulators of different operating pressures and temperatures through said discharge conduit means for receiving supply steam therefrom and superheating the supply steam first of the highest pressure and then of the next lower pressure, and so on in countercurrent to the flow of the supply steam.

32. The combination of claim 20 and wherein at least one accumulator has in its interior a float, a conduit communicating with the float for receiving liquid from the latter accumulator during discharge thereof, and the latter conduit having a pivoted connection with the discharge conduit means which communicates with the latter accumulator to receive liquid therefrom during discharge, so that the float maintains the discharge conduit means in communication with the liquid in the latter accumulator as the liquid level falls during discharge.

33. The combination of claim 20 and wherein a superheater receives supply steam from a discharge conduit means, and at least one superheater accumulator containing a liquid of high boiling point circulated by said circulating means through the superheater for superheating the supply steam therein.

* * * * *